Figure 1:
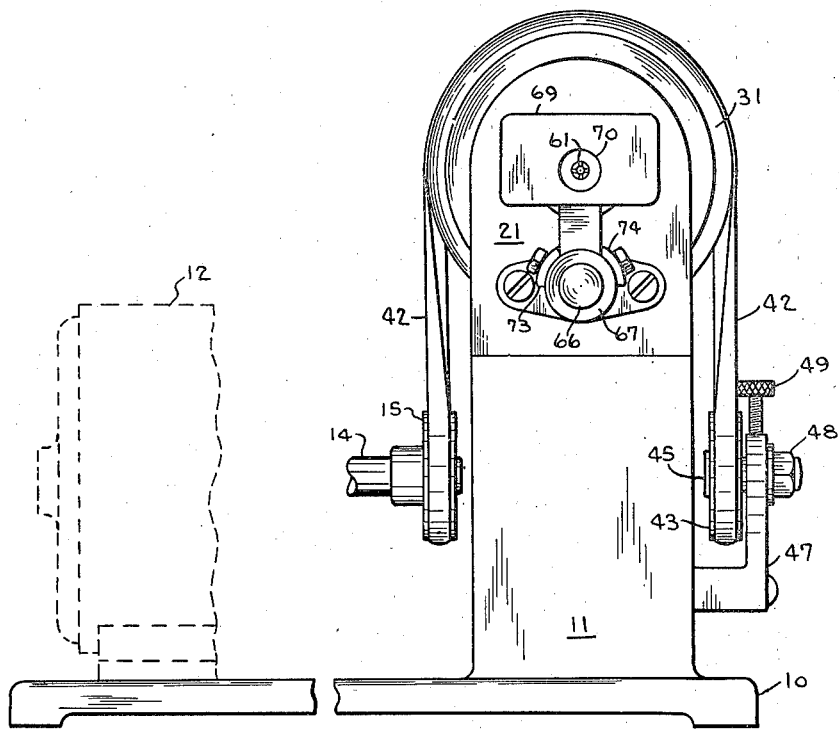

Jan. 21, 1947.   H. M. FIELD   2,414,515
SCREW THREAD CUTTING MACHINE
Filed June 19, 1944   2 Sheets-Sheet 1

Herbert M. Field
INVENTOR.

BY E. G. Buckhorn
Attorney

Jan. 21, 1947.  H. M. FIELD  2,414,515
SCREW THREAD CUTTING MACHINE
Filed June 19, 1944   2 Sheets-Sheet 2

Herbert M. Field
INVENTOR.

BY  E. A. Buckham
Attorney

Patented Jan. 21, 1947

2,414,515

UNITED STATES PATENT OFFICE 2,414,515

SCREW THREAD CUTTING MACHINE

Herbert M. Field, Portland, Oreg.

Application June 19, 1944, Serial No. 540,943

6 Claims. (Cl. 10—136)

The present invention relates to power tools and more particularly to motor driven screw thread cutting machines.

In the cutting of either internal or external threads with a tap or a die, respectively, it is necessary to advance the thread cutting tool toward the workpiece with one direction of rotation until the threads are cut to the required extent, whereupon the direction of rotation of the tool must be reversed to remove it from the work piece. Machines have been built for holding and reversably driving the thread cutting tool but such machines have not been completely satisfactory. Such machines as have been in common use heretofore have not been capable of smooth, accurate control to enable use of the machine except for relatively coarse work. Moreover, such machines have usually been quite expensive, noisy in operation and consisting of a relatively complicated arrangement of operating parts.

It is an object of the present invention, therefore, to provide a new and improved screw thread cutting machine which is particularly suitable for use in connection with fine machine work in that it is capable of accurate control.

It is a further object of the present invention to provide a new and improved motor driven pressure responsive screw thread cutting machine which is compact in design, of light weight, smooth running, very sensitive to pressure, and quiet in operation.

A still further object of the invention is to provide a screw thread cutting machine of the type described which comprises relatively few working parts which are easy to manufacture and assemble and hence of low manufacturing cost.

And another object is to provide a new and improved screw thread cutting machine of the type described having a new and improved driving arrangement.

A still further object of the invention is to provide a new and improved machine of the type described in which the reversible driven element has a low inertia constant to minimize tool breakage.

Another object of the invention is to provide a screw thread cutting machine of the type described with a new and improved workpiece aligning means.

A further object is to provide a motor driven screw thread cutting machine with a new and improved workpiece guiding and gauging arrangement.

And a still further object of the invention is to provide a new and improved motor driven screw thread cutting machine in which the thread cutting element is caused to rotate in one direction upon application of pressure to the forward end of the cutting tool element through the workpiece, the direction of rotation of the tool element being automatically reversed upon release of pressure upon the workpiece, and the tool element coming to rest automatically upon disengagement of the workpiece therefrom.

In accordance with the illustrated embodiment of the invention the machine tool comprises a base frame structure or standard having a thread cutting tool arbor journaled therein, the arbor having a driven disc affixed thereto. A driving disc is arranged on each of the opposite sides of the driven disc and journaled upon the base frame structure concentrically with the driven disc and in a slightly spaced relation with respect thereto. The driving discs are adapted to be rotated in opposite directions by a belt trained thereabout and connected to a driving motor. The arbor is normally at rest with the driven disc floating between the two adjacent oppositely rotating driving discs but the driven disc is axially movable into frictional engagement with either of the driving discs by the application of a slight pressure to the tool arbor. Thus upon movement of a workpiece into engagement with the end of a thread cutting tool secured to the end of the arbor, the arbor is caused to shift axially within the bearing supports therefor and one face of the driven disc is shifted into engagement with an adjacent face of one of the driving discs whereby the driven disc and the tool arbor are rotated in a proper direction to effect advancement of the thread cutting tool into the workpiece. As will be subsequently explained the driven disc is of a special construction whereby it has a low inertia constant so that a minimum of slippage occurs between it and the driving disc prior to its reaching full speed. The momentum of the driven disc and tool arbor will also be low so that upon disengagement of the driven disc from the driving disc, which may be effected by backing the workpiece away from the machine it will rapidly come to rest instead of coasting on. By virtue of a new and improved workpiece guiding and gauging arrangement provided on the machine the workpiece need merely be pressed slightly toward the machine for effecting cutting of the threads to a gauged depth. Immediately upon reaching the gauge depth the rotation of the tool arbor is arrested and upon release of pressure from the workpiece the direction of rotation of the tool arbor is immedately reversed and the thread cutting tool element unscrewed from the workpiece. Upon disengagement of the thread cutting tool element from the workpiece the rotation of the tool arbor is automatically stopped. By virtue of the new and novel construction to be described more fully hereinafter the tool arbor is extremely sensitive to application of pressure so that the machine is particularly suitable for use where fine machine work is required.

Additional objects and advantages of the invention will appear from the following description taken in connection with the accompanying drawings while the features of novelty will be pointed out with greater particularity in the appended claims.

Figure 4:
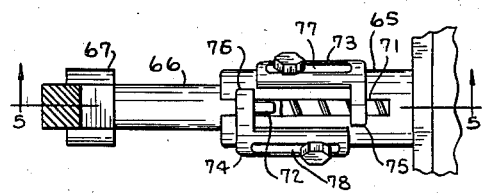
Figure 6:
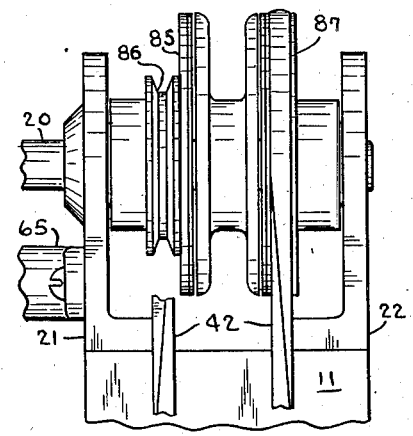
Figure 5:
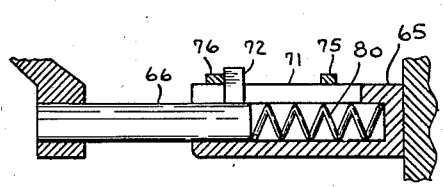
Figure 2:
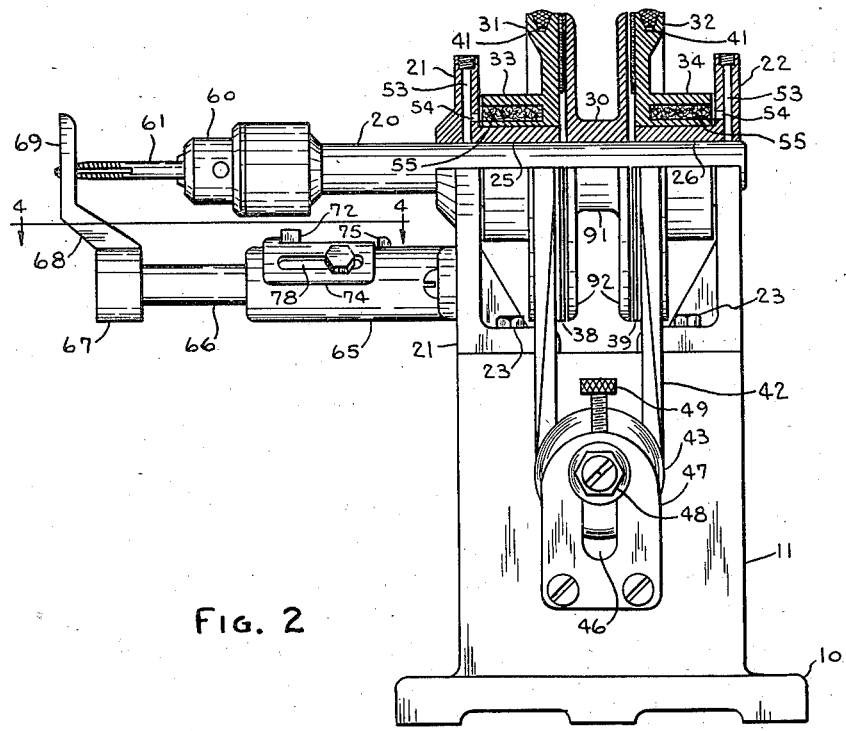
Figure 3:
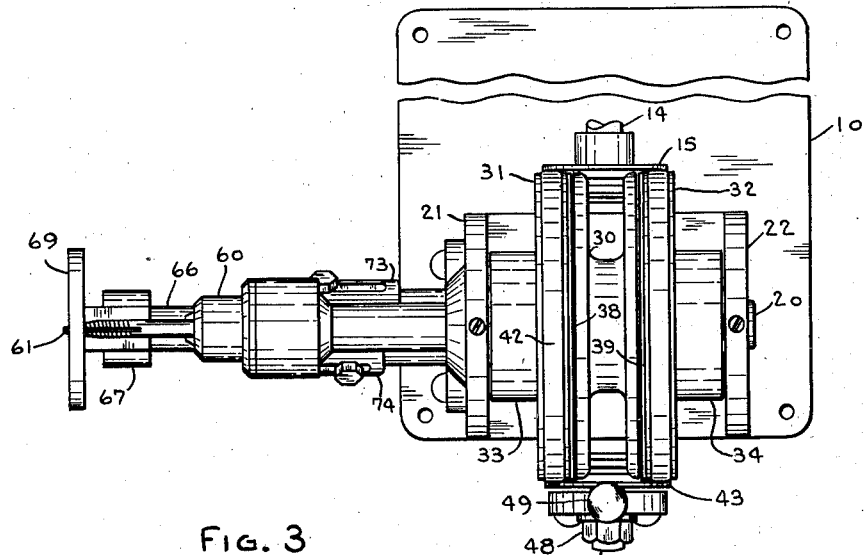

In the drawings Fig. 1 is a front elevation of the screw thread cutting machine; Fig. 2 is an end elevation of the machine as illustrated in Fig. 1, certain portions thereof being shown in section for more clearly illustrating details of construction; Fig. 3 is a plan view of the machine; Fig. 4 is a view taken along the line 4—4 of Fig. 2; Fig. 5 is a cross-sectional view taken along the line 5—5 of Fig. 4, and Fig. 6 is a fragmentary detail view illustrating a further modification of the invention.

Referring now to the drawings, the screw thread cutting machine of the invention comprises a frame supporting structure or standard including a base portion 10 and a pedestal portion 11 formed integrally with the base portion at one end thereof. A driving motor indicated by dotted lines 12 is adapted to be supported upon the base portion 10 to one side of the pedestal while the principal parts of the machine are mounted atop the pedestal 11. It will become obvious as the description proceeds that the machine of the invention may be driven from any suitable rotative source of power operatively connected to the shaft 14 supporting a driving pulley 15 on the end thereof.

A tool arbor 20 is rotatably journaled within a pair of upstanding bracket frame portions 21 and 22 secured as by bolts 23 to the top of the pedestal 11. The bracket frame members 21 and 22 have cylindrical bearing portions 25 and 26, respectively, formed integrally therewith and extending toward each other and defining a gap therebetween. A driven disc unit 30 which will be described more fully hereinafter is fixedly secured to the arbor 20 and is arranged within the gap between the ends of the cylindrical bearing portions 25 and 26. Driving discs 31 and 32 provide with elongate hubs 33 and 34, respectively, are rotatably journaled upon the outer surface of the cylindrical portions 25 and 26 of the frame members 21 and 22. The length of the hubs 33 and 34 corresponds substantially with the length of the cylindrical portions 25 and 26 so that the plane faces of the driving discs 31 and 32 facing the adjacent plane faces of the driven disc 30 are substantially even with the ends of the cylindrical portions 25 and 26. Secured to the faces of the discs 31 and 32 are rings 38 and 39 of a suitable facing material such as cork which may provide smooth frictional engagement with the adjacent faces of the driven disc unit. The spacing between the faces of the driving discs 31 and 32 is just slightly greater than the opposite faces of the driven disc unit 30 so that the latter may assume a positon midway therebetween out of contact with either of the driving discs; this position will be referred to as the neutral or position of rest for the arbor 20.

The driving discs 31 and 32 are each provided with V-belt grooves 41 in their peripheries for cooperatively receiving opposite sides of a V-belt 42 which belt is also trained over the driving pulley 15 as well as a reversing idler pulley 43 mounted upon the opposite side of the base pedestal 11 with respect to the driving pulley 15. The axes of the pulleys 15 and 43 extend in the same direction but at right angles to the axis of the tool arbor 20 and somewhat therebeneath. The effective diameter of the pulleys 15 and 43 corresponds substantially with the spacing between the V-belt grooves 41 in the rims of the driving discs in order that the belt will transfer smoothly therebetween.

The pulley 43 is preferably mounted by frictionless bearings (not shown) upon a stub shaft 45, the end of which projects through the elongate slot 46 provided in the bracket 47 and having a nut 48 thereon for fastening the pulley in place. By slightly loosening the nut 48 the position of the pulley 43 within the bracket 47 may be adjusted by the thumb nut 49 threadedly mounted in the upper end of the bracket 47 and having its lower end in engagement with the upper surface of the shaft 45 within the slot 46. By this mounting arrangement for the pulley 43 the tension of the driving belt 42 may be controlled accurately to provide smooth running of the belt. With the opposite sides of the belt 42 trained over the driving discs 31 and 32 it will be obvious that the two driving discs will be simultaneously driven in opposite directions of rotation.

To provide for the lubrication of the driving discs and the tool arbor, the end frame members 21 and 22 are provided with a vertically extending bore 53 communicating between the upper extremity thereof and the bearing aperture for the arbor 20. A transversely extending hole 54 communicates with the bore 53 above the cylindrical portions 25 and 26. Bores 55 are provided in the hubs 33 and 34 of the discs 31 and 32 which in the proper angular position of the discs communicate with the end of the holes 54. The bores 55 are preferably filled with wicking and provide a reservoir for the excess oil. A pair of similar bores 55 are provided in each of the opposite sides of the disc hubs in order not to unbalance the weight distribution thereof.

The outer end of the arbor 20 is provided with a chuck 60 which is shown as having a tap 61 mounted therein. It will be obvious, as the description proceeds, that another form of thread cutting tool for example, a die, may be substituted for the tap though such a substitution may require a different form of a chuck than that shown in the drawing.

Secured to the bracket frame member 21 directly beneath the tool arbor 20 is a cylindrical member 65 having a shaft 66 slidably mounted therein for movement in a direction parallel with the axis of the arbor 20. Mounted on the outer end of the shaft 66 by means of the boss 67 and offset arm 68 is a platen 69 which platen is provided with an aperture 70 for cooperatively receiving the tap 61 centrally therethrough. As illustrated more clearly in the detail views of Figs. 4 and 5, the upper surface of the cylindrical member 65 is provided with a slot 71 through which projects a lug 72 affixed to the inner end of the shaft 66 which lug maintains the platen 69 in an upright position and the aperture 70 concentric with the axis of the arbor 20. Sliding movement of the shaft 66 within the cylindrical member 65 is controlled by a pair of stop plates 73 and 74 having curved inner surfaces fitting cooperatively around the outer surface of the cylindrical member 65 and provided with lug portions 75 and 76, respectively, projecting over the slot 71 on opposite sides of the lug 72 for limiting the travel of the latter in either direction. The stop plates 73 and 74 are provided with elongated slots 77 and 78 for cooperatively receiving fastening screws threaded into the side walls of the member 65 whereby the spacing between the stop lugs 75 and 76 may be adjusted as desired. A helical spring 80 is arranged within the bore of the cylindrical member 65 which bears against the inner end of the shaft 66 normally urging the latter to its outer limit of travel which outer limit is normally slightly behind the tapered tip of the tap 61. The tip end of the tap is usually permitted to project behind the platen in order that the workpiece may be presented thereto in a properly centered relation. It will be obvious that in the event a die is used instead of a tap the platen unit may be unnecessary and in such event may readily be removed.

The operation of the machine should be obvious from the description as given. With the source of rotative power applied to the machine the driving discs 31 and 32 will be driven in opposite directions of rotation while the driven disc unit 30 floating axially between the driving discs will automatically assume a position midway between the two driving discs and out of contact with either and accordingly will normally be at rest. If it is now desired to tap threads into a pilot hole previously drilled in a workpiece, the workpiece will be held against the surface of the platen 69 with the pilot hole of the workpiece extending over the tapered end of the tap. Inasmuch as the pilot hole will invariably extend in a direction at right angles to the plane of the flat surface of the workpiece if that flat surface is then held in square engagement of the face of the platen 69 the tap 61 must also extend in a properly aligned relation with the direction of the pilot hole to insure that the threads will be cut square with the face of the workpiece. This is of essential importance in all fine machine work. It will be obvious that platens 69 of varying contours may be provided for holding workpieces of curved or irregular shape. Moreover jig means may be provided on the platen for cooperatively receiving particular shapes of workpieces as in mass production operations. The workpiece may be held against the platen 69 between the thumb and fingers of the two hands and by moving the platen and workpiece forward to bring the workpiece into engagement with the end of the tap a slight pressure will initially be exerted against the end of the tap to cause an axial shift of the arbor 20. Such shift of the arbor 20 will carry the face of the driven disc unit 30 into engagement with the face of the driving disc 32 and which will result in forward driving of the arbor and tap and the cutting of threads into the pilot hole of the workpiece. The advancement of the tap into the workpiece will continue only so long as a slight forward pressure is maintained upon the workpiece so as to maintain the driven disc 30 in engagement with the driving disc 32. If at any time this pressure is relaxed the driven disc 30 will stop substantially instantaneously by virtue of the frictional resistance between the tap and the workpiece. Actually, however, the amount of clearance between the driven disc and the opposed driving disc is preferably so slight, of the order of two thousandths of an inch, that the amount of axial movement of the tool arbor 30 required to effect engagement with one or the other of the driving discs is barely perceptible. As soon as the positive forward pressure upon the workpiece is relaxed the force of the helical spring 80 acting against the end of the shaft 66 will immediately tend to urge the workpiece off of the tap 61 and consequently impose a force thereupon reverse to that initially applied by hand. Thus automatically upon the completion of the tapping operation as determined by discontinuance of positive forward pressure by hand upon the workpiece or by engagement of the lug 72 with the rear stop 75 of the platen mounting the spring bias comes into play to reverse the direction of rotation of the tool arbor and unscrew the tap from the workpiece. As soon as the tap has cleared the hole of the workpiece and no axial force in either direction is any longer applied to the tool arbor the driven disc will immediately assume a position of rest between the driving discs.

If desired, the belt groove for the reversing disc 31 may be of a smaller diameter than the groove of the forward driving disc 32 in order that the unscrewing of the tap from the workpiece may be accomplished at a faster rate than the cutting operation. As illustrated in Fig. 6, the reversing disc 85 is shown having a belt groove 86 of a diameter about one half that of the other driving disc 87.

In order that the rotation of the tool arbor 20 respond accurately and substantially instantaneously to the application of pressure, release of pressure, or reversal of pressure applied through the work-piece upon the thread cutting tool, it is important that the driven disc have a low inertia in order that the momentum thereof following disengagement with either of the driving discs will not continue to impress a rotative force upon the cutting tool. Assume, for example, that one is bottom tapping a hole in a workpiece in which case it is necessary that the tap be accurately arrested within a fraction of one turn. The depth of the advancement of the tap into the workpiece may be accurately gauged by the adjustment of the rear stop 75 on the platen mounting. It will be important, however, that the motion of the arbor 20 be arrested immediately upon the engagement of the lug 72 with the stop 75 and disengagement of the driven disc from the driving disc 32. If the inertia of the driven disc were such that its momentum would tend to maintain the rotation of the arbor 20 with any considerable force there would be an extreme likelihood of the tap 61 being snapped in two. This danger would be particularly great when bottom tapping in the smaller screw thread sizes.

For the purpose of maintaining a low inertia constant for the arbor unit of the machine it is important that the arbor itself have a diameter no greater than that reasonably necessary to provide requisite strength, stability and smooth running and also that the driven disc 30 be as light as possible yet of sufficient strength and stiffness. Weight is a matter of great importance in this particular element which must inherently be of relatively large diameter in order to provide a relatively great friction surface for engagement with either of the opposite driving discs. As illustrated in the drawings the driven disc unit 30 is of U-shaped cross-section from the hub outwardly, or in other words, comprises a central hub portion 91 with a relatively thin disc flange 92 on both ends thereof. This dual faced disc element is furthermore made of aluminum in order to maintain the weight thereof as low as possible. The thickness of the end flanges is only as great as that required for providing the necessary rigidity and strength thereto for withstanding the axial forces which may be transmitted thereto through the arbor 20.

The spacing between the V-belt grooves in the driving discs 31 and 32 is more or less limited by the diameter of the driving and idler pulleys 15 and 43 but it will be obvious that the thickness of the driving discs 31 and 32 need not be limited by the considerations with regard to weight to the same extent as the driven disc unit 30. Thus the overall axial thickness of the driven disc unit may be made quite thin simply by increasing the thickness of the driving discs 31 and 32. It will be obvious, however, that while a double flanged disc unit 30 is illustrated in this particular case any double face disc unit of low weight construction and low inertia is represented thereby.

Having described the invention in what is considered to be a preferred embodiment thereof it is desired that it be understood that the details as shown are for purposes of illustration only and that the invention may be carried out by other means.

I claim:

1. A screw thread cutting machine comprising a base, a pair of upstanding bracket frame members mounted on said base and having an arbor rotatably journaled in the upper ends thereof, said bracket frame members including cylindrical bearing portions concentric with said arbor and extending toward each other, the inner ends of said cylindrical bearing portions being spaced apart, a driven disc secured to said shaft between the ends of said cylindrical bearing portions and having a maximum width slightly less than the gap between said cylindrical bearing portions, a driving disc rotatably journaled upon each of said cylindrical bearing portions on opposite sides of said driven disc, means for mounting a screw thread cutting tool on one end of said arbor, said driven disc being adapted to be shifted axially into frictional engagement with the adjacent face of either of said driving discs, means for rotating said driving discs in opposite directions, a platen mounted adjacent the outer end of said arbor for positioning a workpiece cooperatively adjacent the end of the screw thread cutting tool, a shaft supporting said platen and extending axially parallel with said arbor and arranged therebeneath, one of said pair of bracket frame members next adjacent said platen including a cylindrical portion for cooperatively receiving the end of said shaft, said shaft being longitudinally slidable in said cylindrical portion, means for preventing rotational movement of said shaft in said cylindrical portion and adjustable stop means on said cylindrical portion for limiting sliding movement of said shaft therein in either direction of travel.

2. A screw thread cutting machine comprising a frame, an arbor rotatably journaled in said frame, an annular driven element secured to said arbor, a pair of annular driving elements rotatably journaled on each of the opposite sides of said driven element and concentrically therewith, means for rotating said driving elements in opposite directions, said arbor being axially movable to effect frictional engagement of said driven element with either of said driving elements to effect rotation of said arbor in either direction, means for securing a thread cutting element to said arbor, a cylindrical member secured to said frame and extending outwardly therefrom parallel with said arbor, a shaft axially slidable in said cylindrical member, a spring mounted behind the end of said shaft in said cylindrical member and biasing said shaft outwardly therefrom, a platen supported on the end of said shaft and extending adjacent the outermost end of said thread cutting element for aligning a workpiece relative thereto, means on said shaft for maintaining said platen in a predetermined position of alignment with respect to said thread cutting element, and means on said cylindrical member for limiting the movement of said shaft within said cylindrical member in either direction of travel.

3. A machine comprising a frame, an arbor rotatably journaled in said frame, an annular driven element secured to said arbor, a pair of annular driving elements rotatably journaled on said frame on each of the opposite sides of said driven element and concentrically therewith, said arbor being axially movable to effect frictional engagement of said driven element with either of said driving elements to effect rotation of said arbor in either direction, means for securing a tool element to the end of said shaft, a platen for supporting a workpiece in working relation adjacent said tool element, a shaft supporting said platen extending parallel with said arbor, means on said frame cooperatively receiving said shaft for longitudinal sliding movement therein, spring means engaging and resiliently urging said shaft away from said tool element, and adjustable stop means fixedly secured relative to said frame for limiting axial movement of said shaft in either direction of movement.

4. A machine comprising a frame, an arbor rotatably journaled in said frame, an annular driven element secured to said arbor, a pair of annular driving elements rotatably journaled upon said frame on each of the opposite sides of said driven element and concentrically therewith, means for rotating said driving elements in opposite directions, said arbor being axially movable to effect frictional engagement of said driven element with either of said driving elements to effect rotation of said arbor in either direction, means for supporting a tool element on the outer end of said arbor, a bracket plate adapted for receiving a workpiece thereagainst, a shaft extending parallel to said arbor and arranged therebeneath, said frame including a cylindrical portion for cooperatively receiving the end of said shaft, said shaft being axially slidable in said cylindrical portion, said cylindrical portion being slotted lengthwise along one side, a lug secured to said shaft and extending through said slot for precluding rotational movement of said shaft in said cylindrical portion, an adjustable stop means mounted on said cylindrical portion and adapted to be engaged by said lug for limiting axial movement of said shaft in either direction of travel.

5. A machine comprising a base having a pedestal at one end thereof, a pair of upstanding bracket frame members secured to the top of said pedestal, a tool supporting arbor extending through and rotatably journaled in said members, said bracket frame members including cylindrical bearing portions concentric with said arbor and extending toward each other and defining a gap therebetween, a double faced driven disc secured to said arbor within said gap between said cylindrical bearing portions, a driving disc rotatably mounted upon each of said cylindrical bearing portions on each of the opposite sides of said driven disc, a belt for driving said last mentioned discs in opposite directions, the faces of said driven disc being adapted to be moved into frictional engagement with the adjacent faces of either of said driving discs by pressure exerted axially against said arbor, a motor mounted on said base and having a driving pulley for said belt extending axially at right angles with respect to the axis of said arbor, an idler pulley rotatably mounted on the opposite side of said pedestal with respect to said motor and in substantially axial alignment with said motor pulley.

6. A machine comprising a base, a pair of upstanding bracket frame members mounted on said base, a tool supporting arbor rotatably journaled in said bracket frame members, said bracket frame members including cylindrical bearing portions concentric with said arbor and extending toward each other and defining a gap therebetween, a driven disc secured to said arbor between said cylindrical bearing portions, a driving disc rotatably journaled upon each of said cylindrical bearing portions on each of the opposite sides of said driven disc, said driving discs being adapted to be driven in opposite directions, the faces of said driven disc being adapted to be moved into frictional engagement with the adjacent face of either of said driving discs by pressure exerted axially against said arbor through a workpiece engaging said tool to effect rotation of said arbor in either direction, said driving discs having belt grooves in their rims, a motor mounted on said base including a belt pulley extending relatively closely adjacent said bracket frame members below said discs and extending at right angles relative to the axis of said arbor, an idler pulley mounted on the opposite side of said bracket frame members in substantially axial alignment with said first pulley, a belt arranged around said two pulleys with the opposite sides thereof extending in the grooves of said driving discs, and means for adjusting the position of said idler pulley for varying the tension of said belt.

HERBERT M. FIELD.